June 5, 1956 F. ULRICH 2,748,440
SLIDE FASTENERS
Filed June 24, 1950 2 Sheets-Sheet 1
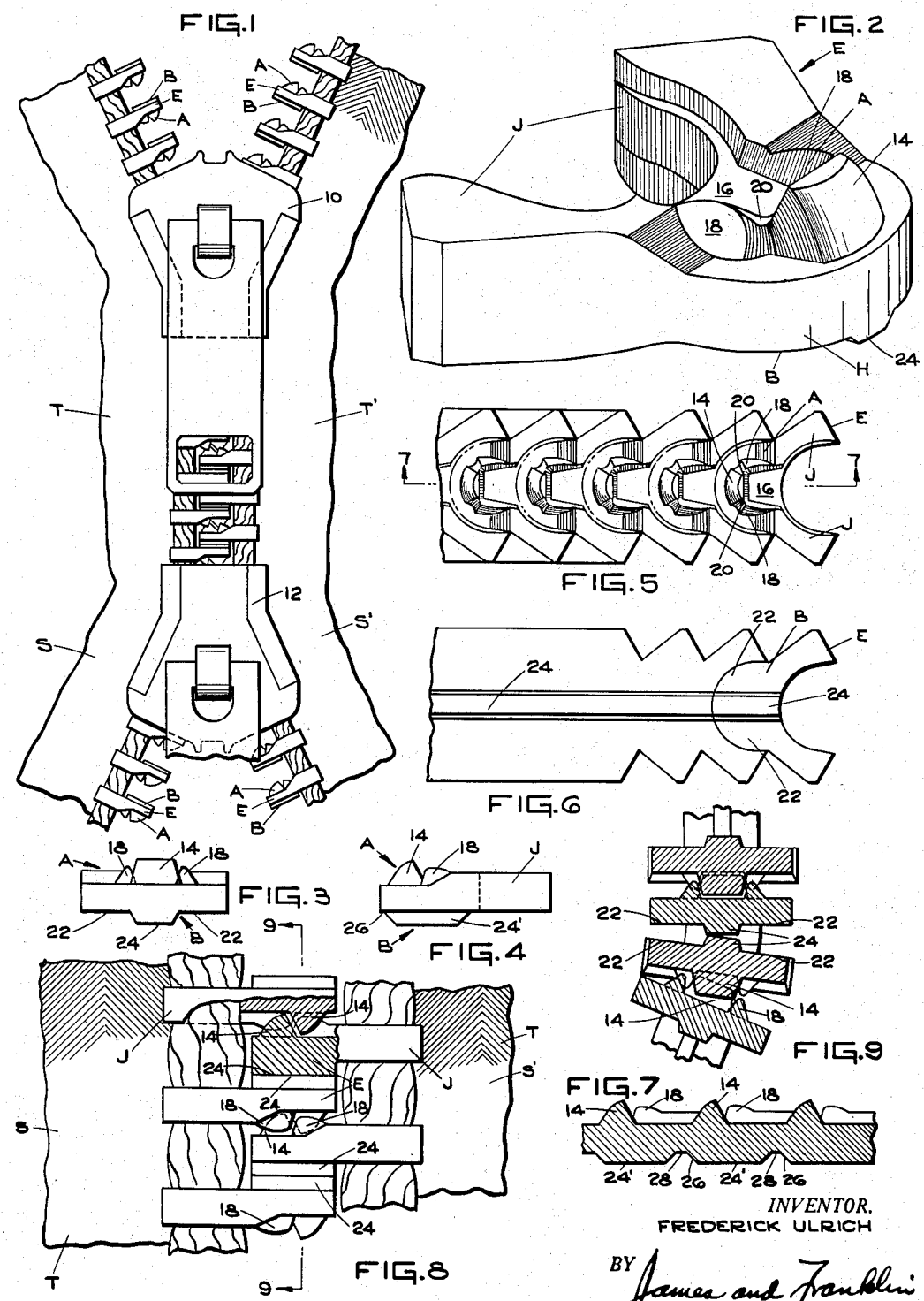
INVENTOR.
FREDERICK ULRICH
BY James and Franklin June 5, 1956 — F. ULRICH — 2,748,440
SLIDE FASTENERS
Filed June 24, 1950 — 2 Sheets-Sheet 2

*INVENTOR.*
FREDERICK ULRICH
BY *James and Franklin*

United States Patent Office 2,748,440
Patented June 5, 1956

2,748,440

SLIDE FASTENERS

Frederick Ulrich, Jersey City, N. J., assignor to Conmar Products Corporation, Newark, N. J., a corporation of New Jersey Application June 24, 1950, Serial No. 170,110

9 Claims. (Cl. 24—205.13)

The invention relates to slide fasteners, and more particularly to slide fasteners of the double-acting type and fastener elements therefor.

A so-called "double-acting" fastener is one which will function properly regardless of the direction in which the sliders are faced relative to the elements. This makes it possible to employ two oppositely directed sliders on a pair of stringers for special purposes. It also is of advantage in case of accidental opening of the fastener beneath the slider.

Various types of fastener elements have been developed which permit the use of identical elements on both stringers. The "identical scoop" concept permitted the achievement of modern high speed, relatively inexpensive production methods for manufacturing double-acting fasteners which could not otherwise be attained with fasteners utilizing "right" and "left" elements.

The sine qua non of the prior art "identical scoop" type of double-acting fasteners known to me is that the interlockable fastener elements are each provided on both sides of its coupling head with interlocking means for preventing the transverse and lateral disengagement of meshed elements on opposing stringers. In one form or another, they are provided with both a projection and a pocket, or their equivalents, on each of the two opposite sides of the fastener element.

According to my invention, a double-acting fastener is provided with fastener elements of identical construction on both mating stringers. However, the fastener elements are formed of a configuration which is greatly simplified and which thereby makes it possible to simplify the tools for manufacturing the fastener, whether the fastener elements are made by coining, molding or diecasting. The simplification of the "identical scoop" type of double-acting fastener is achieved by providing one side only of each fastener element with means which will interlock with a similar side on the opposing stringer to prevent disengagement of the elements.

Thus, the primary object of the invention is to simplify the construction or configuration of fastener elements for double-acting fasteners of the "identical scoop" type. Concomitantly, an important object of the invention is to simplify the methods and tools for manufacturing the aforesaid type of double-acting fasteners and their fastener elements, whether the fasteners are produced by coining, molding or diecasting.

A more specific object of the invention is to provide a double-acting slide fastener having fastener elements of identical construction on both stringers, the fastener elements being formed with one side only having means to prevent transverse and lateral disengagement of meshed elements.

A further object of the invention is to provide a double-acting fastener of the "identical scoop" type, wherein the elements or scoops are formed to permit the fastener to be subjected to extreme flexure while preventing flexural, as well as transverse and lateral disengagement of meshed elements, even though means for preventing transverse and lateral disengagement are omitted from one side of each element's coupling head.

To accomplish the foregoing general objects, and other more specific objects which will hereinafter appear, my invention resides in the novel slide fasteners and component fastener elements, and their relationships to one another as are hereinafter more particularly described by the following specification. The specification is accompanied by drawings in which:

Fig. 1 is a fragmentary view of a double-acting slide fastener made in accordance with the invention;

Fig. 2 is a perspective view, drawn to enlarged scale, of a fastener element forming a part of the slide fastener shown in Fig. 1;

Fig. 3 is a front end view of the fastener element shown in Fig. 2;

Fig. 4 is a side elevation of a modified fastener element;

Fig. 5 is a plan view of a fastener element strip from which the fastener element shown in Fig. 2 is formed prior to or while attaching same to the edge of a tape;

Fig. 6 is a bottom plan view of the strip shown in Fig. 5;

Fig. 7 is a partial cross-section taken approximately in the plane of line 7—7 of Fig. 5, but modified to illustrate the manner of producing the fastener element shown in Fig. 4;

Fig. 8 is a fragmentary view, partly in section and on a larger scale, of the slide fastener shown in Fig. 1;

Fig. 9 is a section taken approximately in the plane of line 9—9 of Fig. 8, but illustrating the co-action of the fastener elements when the slide fastener is flexed upon itself;

Figure 10:
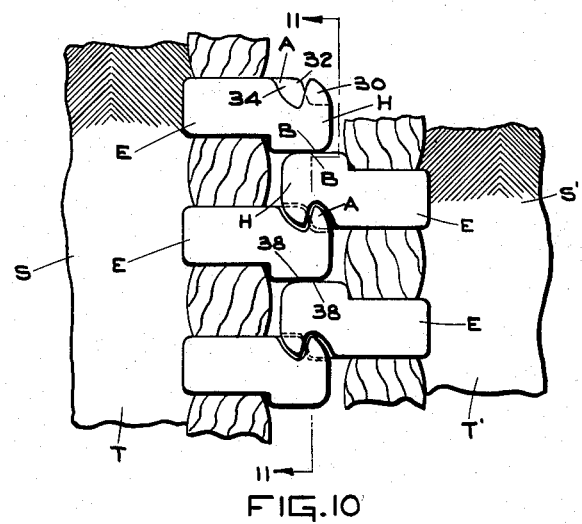
Fig. 10 is a fragmentary view of a slide fastener illustrating another form of the present invention.

Referring to the drawings, the invention in all illustrated forms comprises a double-acting fastener having a pair of stringers S and S', which are provided with fastener elements E disposed in substantially equally spaced relationship. The fastener elements may take many forms; however, all forms include a coupling head H having two opposite sides A and B which differ in configuration from each other. With the fastener elements secured to the stringers, as by means of a pair of jaws J encompassing the beaded edge of the tape T, the coupling head sides of like configuration are disposed in the same direction on their respective stringers but are disposed in opposite directions on opposite stringers. Thus, the stringer S has the sides A facing downwardly and has the sides B facing upwardly, whereas on the stringer S' the sides A face upwardly and the sides B downwardly. (The sides A may face upwardly and the sides B downwardly on the stringer S with the converse on the stringer S'.) This polarization of the stringers does not present any new problem in the factory, and no more effort is required than is presently the case with the more common single-acting fastener, where the stringers must be polarized so that the projections on opposite stringers will be faced in the same direction. In the present invention, the stringers are reversely polarized. If desired, the fastener may comprise a single stringer, folded upon itself as shown in Morin Patent No. 2,378,719, granted June 19, 1945.

One side only, the side A of the coupling head H, is provided with means for interlockably engaging a like side A on the opposite stringer to prevent each opposite pair of interlocked or meshed elements from becoming disengaged from each other when disengaging forces are applied transversely (across the fastener), or laterally (in a plane perpendicular to the length of the fastener). The interlocking sides A are identical, and preferably are provided with both a projection and pocket.

The other side of the head, the side B, is formed with a very simple configuration. Projections, pockets, or both, in the usual interlocking sense, are entirely omitted. While the non-interlocking side B may be a flat surface, I greatly prefer that it be given a configuration or contour which will facilitate flexing of the fastener upon itself. This may be accomplished by relieving the elements between the edge portions of the non-interlocking sides, as by reducing the thickness of the coupling head H longitudinally along its edges.

In operation, when a slider is moved along the stringers in fastener closing direction, the sides A on opposing stringers interlock with each other to prevent disengagement of the elements in planes transversely and laterally of the fastener. Notwithstanding the absence of interlocking means on the opposite sides B, the interlocked sides A will prevent disengagement of the fastener elements when forces are applied in transverse and lateral directions. It is essential, however, that the interlocked elements of the fastener do not become disengaged when the fastener is flexed upon itself, a treatment which sometimes occurs in regular usage. My novel fastener resists this type of disengaging force because upon flexure the sides B of any pair of meshed elements bear against the sides B of the next adjacent elements to limit the relative movement between, and so to prevent the sides A from disengaging.

Actually, in an easy running fastener the sides B need not quite touch each other when the fastener is not being flexed, but when the fastener is flexed the sides B will press against each other to prevent the elements from disengaging. Also, the sides A will press against each other to limit the relative movement between, and to prevent the sides B from moving out of contact with each other, even though the sides B are devoid of means which in themselves could interlock to prevent them from disengaging. In other words, through the stringer or tape areas are flexible between any pair of adjacent fastener elements, the application of all the different types of disengaging forces which may conceivably be applied to the meshed fastener, whether transversely, laterally or flexurally, will not open the meshed elements. The rigidity, mass and configuration of the fastener elements serve to so limit their relative movement as to prevent their disengagement except by means of a slider.

Consideraing the form of the invention shown in Fig. 1 in greater detail, the double-acting fastener comprises the two stringers S and S' having identically formed elements arranged longitudinally thereof along the beaded edges of the tapes T in substantially equally spaced relationship. Each of the elements is secured to the beaded edge of the tape T by means of its jaws J. A pair of sliders 10 and 12 are oppositely disposed on the fastener with their narrow or stem ends toward each other. It will be understood that the sliders may be disposed on the fastener with their wide or neck ends toward each other, or with the neck end of one slider toward the stem end of the other slider. This universality of slider disposition on the fastener is made possible by the double-acting quality of the fastener.

One of the fastener elements used on both stringers shown in Figs. 1, 8 and 9, is shown in Figs. 2 and 3. All of the elements of the fastener are alike and identical in construction. The head H comprises two opposite sides one only of which has interlocking means. The interlocking means preferably takes the form of a projection 14 and a pocket, recess or depression 16. The interlocking means preferably is formed in the same manner as described in the pending application of William Mikulas, Serial Number 74,785, filed February 5, 1949, now Patent No. 2,622,295 and having the same assignee as the present application. The projection 14 is disposed at or near the leading edge or nose of the coupling head H and is located substantially on a median line longitudinally of the element so that it is centrally located with respect to the sides of the element. A pair of laterally spaced ridges 18 are disposed one on each side of the projection 14 so that the ridges may be generally and positionally described as being spaced equal segments on an arc, with the projection 14 constituting the connecting segment. The projection 14 and the ridges 18 form the pocket 16 which is set back toward the jaws J relative to the projection. Channels 20 are provided between the ridges 18 and the projection 14. The channels 20 permit projections and ridges on opposed elements to provide large engaging surface areas and prevent lateral, transverse and flexural disengagement while maintaining a high degree of flexibility between elements.

The side B has no interlockable means such as were above described for the side A. The side B may be flat, but it is preferred that means be provided to allow flexure of the fastener or between meshed fastener elements. Thus, the side B preferably is formed with a crown by reducing the thickness of the head longitudinally along its edges 22 as shown in Fig. 3. This may be accomplished by simply providing the side B with a rib 24 which extends longitudinally and centrally of the head.

While the fastener elements may be formed by molding or diecasting, for the present embodiment of the invention they preferably are formed by preliminarily coining a wire into a strip having a continuous series of embryo elements, as shown in Figs. 5 and 6. This is commonly called a scoop strip. The wire may be coined to the desired shape in a separate punch press, or in the very same machine which severs the elements from the strip and attaches them to the tape. However, for economy and high speed manufacture, the strip preferably is coined by rolling the same between appropriately shaped coining rolls. The rolling apparatus need not be described here for it may be substantially of the character shown and referred to in the aforementioned pending application of William Mikulas, with one apparent and important exception. Instead of requiring two rolls having the relatively complicated contours necessary to impart to both sides of the strip the complex configuration shown in Fig. 5, one of the two rolls may simply be provided with a continuous peripheral groove complementary with respect to the shape of the smooth continuous uniform rib 24 shown in Fig. 6. A coining roll having such a simple contour for producing the non-interlocking side B is almost negligible in cost, compared to the cost of a roll for producing a second interlocking side.

A second advantage in the manufacture of the slide fastener stemming from the described simplification of the fastener element shape resides in the improved guiding of the strip permitted by the longitudinally extending rib 24. It has previously been the practice to guide the sides of the scoop strip, in the attaching machine or so-called scoop machine where the fastener elements are severed from the strip and attached to the tape. As will be evident from Figs. 5 and 6, the edges of the strip at the forward end, at least, are serrated, and guiding must be accomplished with the small surface areas afforded by the spaced points. The new ribbed configuration of the side B permits movement of the rib in a guide groove formed in the machine, so that the strip cannot be laterally displaced in its high speed movement towards the severing punch and die.

A third and very important advantage afforded by the described simplification of the fastener element shape is the elimination of the pitch matching problem in the formation of the two opposite sides of the fastener element strip by the coining rolls. When roll-coining a fastener element strip having the relatively complicated contours of a head and pocket on both sides of the strip, it is necessary to initially match the coining rolls for the purpose of obtaining a matching of the impressions to be formed on both sides of the strip. Even if the coining rolls are initially matched, in some instances this matching is lost after the rolls have been rotating for some time. The slightest shift of the rolls in their bearings, unequal wear of the rolls, etc. can result in the loss of the desired uniform and matched pitch on both sides of the embryo fastener elements being formed in the strip. When this pitch match is lost in the high speed rolling operation, a great deal of wire may be ruined before the fault can be detected and corrected. There is also a loss in operating time of the machine. Since, in accordance with the present invention, one of the rolls need be provided with only a simple peripheral groove, it is no longer necessary to initially match the coining rolls, nor to be concerned with the rolls staying in matched relationship as they are rotating.

Still another advantage of the present invention is the simplification of the scoop severing die employed in the scoop machine. Heretofore when the side B was made of the same complex configuration as the side A, the scoop severing die was complicated in shape, and difficult to grind to the exact dimensions required to receive such contour. Since the side B now has a very simple contour, the scoop severing die requires but a very simple grinding operation and this is a great saving in maintenance cost, as well as more efficient operation. It may be mentioned also that if the elements are molded plastic elements, or are diecast elements, there is corresponding advantage because of the simplified shape of the mold or die required.

As is evident from Figs. 1 and 8, movement of either of the sliders 10 or 12 in a fastener closing direction results in the projections 14 being received in the pockets 16 of the elements on the opposing stringer. When the projections and pockets are thus interlocked, the fastener cannot be opened by the application of transverse forces or by the application of cross pull. Transverse disengagement is prevented by the interference caused by a projection 14 of one element bearing against the rear surface of the projection of the opposite element. When lateral disengaging forces are applied to the fastener, these forces being perpendicular to the plane of the sheet upon which the fastener is illustrated, the projections 14 on elements thus interlocked will bear against the ridges 16 of the opposite elements and thereby prevent disengagement in this direction. When the fastener is subjected to flexure, as when it is folded upon itself as partially shown in Fig. 9, the relieved edges 22 permit the fastener to be bent about a very small radius, thereby permitting a maximum of flexibility. The projections 14 will not come out of the pockets 16 and opposing ribs 24 will not lose contact because the relative movement between the ribs is limited by the interference presented by interengaged projections and ridges of opposite elements. Also, the interengaged projections and ridges of opposite elements limit the relative movement and prevent any pair of opposing ribs 24 from slipping out of bearing contact.

A further and optionally usable refinement of the invention is shown in Figs. 4 and 7. To afford somewhat smoother operation by the slider, the head may be provided with a bevel 26 at its forward edge. This bevel, if wanted, may be formed by the punch and die which severs the fastener elements in the scoop machine, while using the continuous rib 24 shown in Fig. 6. As an alternative, the bevel may be made by providing the rib 24' with a series of equally spaced indentations 28 as shown in Fig. 7.

For this purpose the coining roll for forming the side B is provided with a series of equally spaced projections within the groove which forms the rib. In this case, however, the advantage of the bevel is counteracted by the disadvantage of complicating the rolling operation, and therefore many may prefer to retain the continuous rib. If the elements are molded or diecast, the cavity of the mold or die may be provided with the desired bevel.

Figure 11:
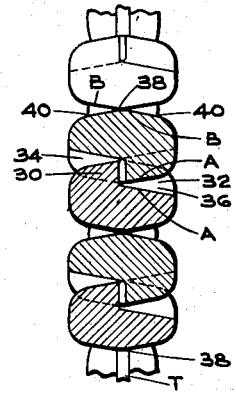
Fig. 11 is a section taken approximately in the plane of line 11—11 of Fig. 10.

A different form of the invention is shown in Figs. 10 and 11, which differs from the embodiment previously described in two main respects. The interlocking side A of each of the fastener elements, instead of having a projection and pocket substantially centrally and longitudinally of the coupling head H, is formed in the manner illustrated in the patent to George A. Siff, No. 2,394,211, granted February 5, 1946. The interlockable means on both stringers are identical, and comprise a pair of diagonally offset projections 30 and 32 and a pair of diagonally offset depressions, recesses or pockets 34 and 36.

The side B instead of being provided with a rib, is shown formed with a crowned portion having a convex surface 38 centrally of the head. Preferably, the convex surface has its axis extending longitudinally of the coupling head. This results in the side B having the relieved portions 40 extending longitudinally along its edges to permit the fastener to be subjected to extreme flexure. This form of the invention with its highly simplified configuration of fastener elements, all of which are identical on both stringers, particularly lends itself to coreless molding or diecasting. It will be understood, however, that a fastener made with elements of this construction could also be coined.

Figure 12:
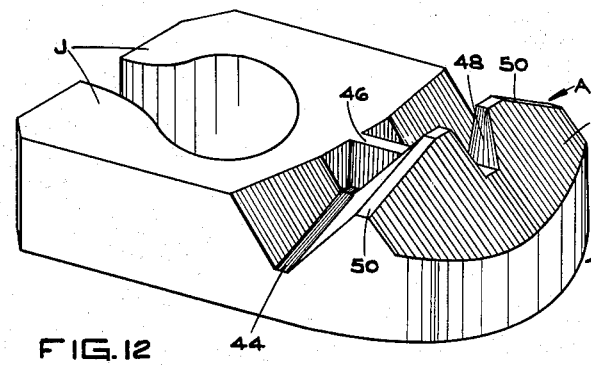
Fig. 12 is a perspective view, drawn to enlarged scale, of a fastener element illustrating still another form of the present invention.
Figure 14:
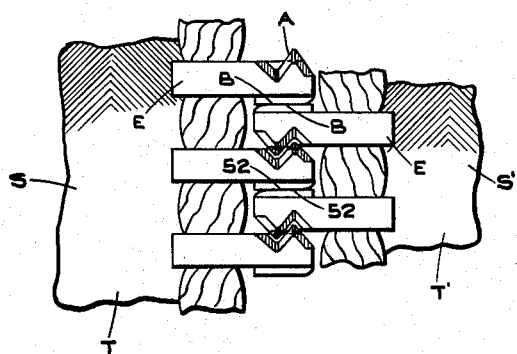
Fig. 14 is a fragmentary view of a slide fastener, the fastener elements of which are of the form shown in Figs. 12 and 13.
Figure 13:
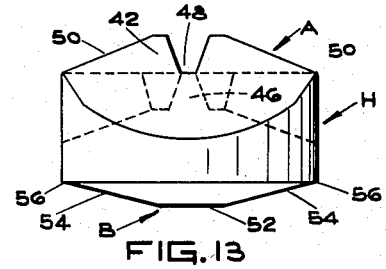
Fig. 13 is a front end view of the fastener element shown in Fig. 12.

Figs. 12, 13 and 14 illustrate still another form of the invention. The interlockable means provided on the sides A of the fastener elements comprise a projection 42 extending laterally of the coupling head behind which is located a laterally extending groove or pocket 44 which is open to the sides. To prevent lateral disengagement, the groove 44 is provided with a central rib 46 in line with a slot 48 within the projection 42. The rib 46 on one element is received within a slot 48 on an opposite element when the elements are interlocked. To increase flexure between fastener elements, the projection 42 is beveled along its sides at 50. The interlocking sides of the elements on the other stringer are the same.

The non-interlocking side B is provided with a crown to facilitate extreme flexure of the fastener. The crown takes the form of a flat surface portion 52 extending longitudinally and centrally of the head, with two oppositely inclined sides 54 between the portion 52 and the longitudinal side edges 56 of the coupling head. The non-interlocking sides on both stringers are preferably alike so that the scoops are all identical. The relationship of the elements to each other on the stringers S and S' and the operation of the fastener is substantially the same as previously described. A fastener having elements of this construction may be coined, molded or diecast.

Figure 15:
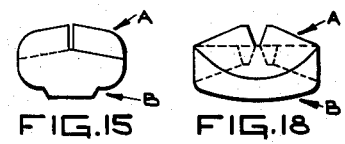
Figs. 15 through 20 are schematic illustrations of modified fastener elements showing how the several illustrated top sides may be combined with the several illustrated bottom sides in different combinations.
Figure 18:
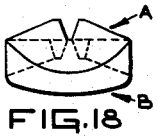
Figure 16:
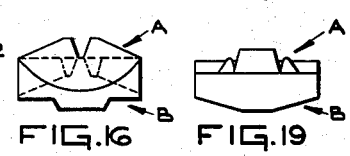
Figure 19:
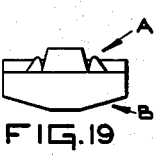
Figure 17:
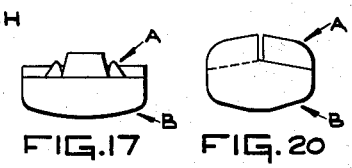
Figure 20:
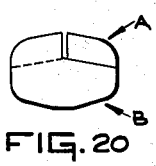

It will be understood that the scope of the invention includes fastener elements in which any one of the interlockable means shown for the side A is combined with any one of the non-interlocking sides B shown. To be specific, the ribbed side B shown in Figs. 1–9 may be employed with the interlockable means of Figs. 10 and 11, as illustrated in Fig. 15, or with the interlockable means of Figs. 12–14 as illustrated in Fig. 16. The convex or crowned side B shown in Figs. 10 and 11 may be employed with the interlockable means of Figs. 1–9 as illustrated in Fig. 17, or with the interlockable means of Figs. 12–14 as illustrated in Fig. 18. The flat crowned side B shown in Figs. 12–14 may be employed with the interlockable means of Figs. 1–9 as illustrated in Fig. 19, and with the interlockable means of Figs. 10 and 11 as illustrated in Fig. 20. Reference to the ribbed side B is intended to include both the continuous rib of Figs. 6 and 8, and the interrupted or bevel-ended rib of Figs. 4 and 7.

It is believed that the construction of my novel fasteners and fastener elements, as well as the advantages thereof, will be apparent from the foregoing description. It will also be understood that while I have shown and described the invention in several preferred forms, many changes may be made in the fastener and the fastener elements thereof without departing from the spirit of the invention as sought to be defined in the following claims.

I claim:

1. A double-acting slide fastener comprising a pair of stringers having fastener elements secured therealong, each fastener element having a head with an interlocking side and an opposite non-interlocking side, the interlocking sides of the elements on the two stringers being of identical construction and facing each other for interlocking engagement, the opposite or non-interlocking sides each being provided with a longitudinally extending projecting portion having an outer face which is parallel to both the length and the width of a fastener element, said projecting portions bearing against one another to hold the interlocking sides of adjacent elements in engagement, said elements being relieved at the edge portions of said non-interlocking sides in order to facilitate flexing of the fastener upon itself.

2. A double-acting slide fastener comprising a pair of stringers having fastener elements secured therealong, each fastener element having a head with an interlocking side and an opposite non-interlocking side, the interlocking sides of the elements on the two stringers being of identical construction and facing each other for interlocking engagement, the opposite or non-interlocking sides each being provided with a longitudinally extending projecting portion having an outer face which is parallel to both the length and the width of a fastener element, said projecting portions bearing against one another to hold the interlocking sides of adjacent elements in engagement, each projecting portion being a rib which has longitudinally extending side edges the planes of which are generally transverse to the plane of the aforesaid outer face, whereby the edge portions of said non-interlocking sides are relieved in order to facilitate flexing of the fastener upon itself.

3. A double-acting slide fastener comprising a pair of stringers having fastener elements secured therealong, each fastener element having a head with an interlocking side and an opposite non-interlocking side, the interlocking sides of the elements on the two stringers being of identical construction and facing each other for interlocking engagement, the opposite or non-interlocking sides each being provided with a longitudinally extending projecting portion having an outer face which is parallel to both the length and the width of a fastener element, said projecting portions bearing against one another to hold the interlocking sides of adjacent elements in engagement, said elements being relieved at the edge portions of said non-interlocking sides in order to facilitate flexing of the fastener upon itself, the aforesaid interlocking sides each comprising a projection and a pair of ridges, said projection and ridges defining a pocket, and a channel intermediate each ridge and the projection, said channels permitting projections and ridges on like coupling head sides to provide large engaging surface areas for preventing lateral, transverse and flexural disengagement while maintaining a high degree of flexibility between elements.

4. A double-acting slide fastener comprising a pair of stringers having fastener elements secured therealong, each fastener element having a head with an interlocking side and an opposite non-interlocking side, the interlocking sides of the elements on the two stringers being of identical construction and facing each other for interlocking engagement, the opposite or non-interlocking sides each being provided with a longitudinally extending projecting portion having an outer face which is parallel to both the length and the width of a fastener element, said projecting portions bearing against one another to hold the interlocking sides of adjacent elements in engagement, each projecting portion being in the form of a rib which has longitudinally extending side edges the planes of which are generally transverse to the plane of the aforesaid outer face, whereby the edge portions of said noninterlocking sides are relieved in order to facilitate flexing of the fastener upon itself, the aforesaid interlocking sides each comprising a projection and a pair of ridges, said projection and ridges defining a pocket, and a channel intermediate each ridge and the projection, said channels permitting projections and ridges on like coupling head sides to provide large engaging surface areas for preventing lateral, transverse and flexural disengagement while maintaining a high degree of flexibility between elements.

5. An element strip for use in the manufacture of slide fasteners, said strip being a wire of indefinite length having a width substantially greater than its thickness, the width corresponding to the width of an element with spread jaws spread so widely as to receive the head of an adjacent element therebetween, one side only of said strip being shaped to provide projections and recesses for interlocking purposes on the nested embryo elements, the other side of said strip being devoid of interlocking means but having a continuous rib of uniform and substantially final cross-section running longitudinally of the strip.

6. An element strip for use in the manufacture of slide fasteners, said strip being a wire of indefinite length having a width substantially greater than its thickness, the width corresponding to the width of an element with spread jaws spread so widely as to receive the head of an adjacent element therebetween, one side only of said strip being shaped to provide projections and recesses for interlocking purposes on the nested embryo elements, the other side of said strip being devoid of interlocking means but having a continuous rib of uniform and substantially final cross-section running longitudinally of the strip, the side edges of said strip having serrations defining diverging outer sides for the spread jaws of the elements.

7. A slide fastener element strip comprising a series of embryo elements each of which has a head and spread jaws, said elements being in nested relation with the head of one element disposed between the jaws of the adjacent element without scrap or waste therebetween, the head of each element having on one side a projection and a pair of ridges, said projection and ridges defining a pocket set back toward the jaws relative to the projection, and a channel intermediate each ridge and the projection, the opposite side of the strip being devoid of interlocking means but having a smooth continuous bead or ridge of uniform and substantially final cross-section extending longitudinally of the strip medially of the edges thereof.

8. A slide fastener element strip comprising a series of embryo elements each of which has a head and spread jaws, said elements being in nested relation with the head of one element disposed between the jaws of the adjacent element without scrap or waste therebetween, the head of each element having on one side a projection and a pair of ridges, said projection and ridges defining a pocket set back toward the jaws relative to the projection, and a channel intermediate each ridge and the projection, the opposite side of the strip being devoid of interlocking means but having a smooth continuous bead or ridge of uniform and substantially final cross-section extending longitudinally of the strip medially of the edges thereof, the side edges of said strip having serrations defining diverging outer sides for the spread jaws of the elements.

9. A slide fastener element strip comprising a series of embryo elements each of which has a head and spread jaws, said elements being in nested relation with the head of one element disposed between the jaws of the adjacent element without scrap or waste therebetween, the head of each element having on one side a generally flat base with a projection and a pair of ridges, said projection and ridges defining a pocket set back toward the jaws relative to the projection, with the bottom of the pocket forming a part of said base, and a channel intermediate each ridge and the projection, the opposite side of the strip being devoid of interlocking means but having a smooth continuous bead or ridge of uniform and substantially final cross-section extending longitudinally of the strip medially of the edges thereof, the side edges of said strip having serrations defining diverging outer sides for the spread jaws of the elements, and ends which are substantially perpendicular to the sides of the jaws, said jaws being so shaped as to be substantially parallel when closed.

References Cited in the file of this patent

UNITED STATES PATENTS

| Number | Name | Date |
|---|---|---|
| 178,729 | Butler | June 13, 1876 |
| 326,152 | Richards | Sept. 15, 1885 |
| 342,173 | Bock | May 18, 1886 |
| 1,650,649 | Phillips | Nov. 29, 1927 |
| 1,803,106 | Freysinger | Apr. 28, 1931 |
| 1,837,036 | Giles | Dec. 15, 1931 |
| 2,221,740 | Ulrich | Nov. 12, 1940 |
| 2,331,618 | Morin | Oct. 12, 1943 |
| 2,347,428 | Morin | Apr. 25, 1944 |
| 2,394,211 | Siff | Feb. 5, 1946 |
| 2,460,525 | Morin | Feb. 1, 1949 |
| 2,497,122 | Frank | Feb. 14, 1950 |
| 2,612,795 | Kaufman | Oct. 7, 1952 |
| 2,622,295 | Mikulas | Dec. 23, 1952 |

FOREIGN PATENTS

| Number | Country | Date |
|---|---|---|
| 160,739 | Switzerland | of 1933 |
| 748,335 | France | of 1933 |
| 41,016 | France | of 1932 |